(12) United States Patent
Hamada

(10) Patent No.: US 7,554,741 B2
(45) Date of Patent: Jun. 30, 2009

(54) OPTICAL TRANSMISSION DEVICE AND LIGHT-RECEIVING MODULE

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 11/539,978

(22) Filed: Oct. 10, 2006

(65) Prior Publication Data
US 2007/0201805 A1 Aug. 30, 2007

(30) Foreign Application Priority Data
Oct. 11, 2005 (JP) .............................. 2005-296976

(51) Int. Cl.
*G02B 27/30* (2006.01)
(52) U.S. Cl. ........................................ 359/641; 359/639
(58) Field of Classification Search .................. 359/641
See application file for complete search history.

(56) References Cited
U.S. PATENT DOCUMENTS
2006/0072196 A1* 4/2006 Hyde et al. ................. 359/494
2006/0171032 A1* 8/2006 Nishioka .................... 359/566
2007/0065069 A1* 3/2007 Bratkovski et al. ............. 385/8

FOREIGN PATENT DOCUMENTS

| JP | 11-218627 | 8/1999 |
|---|---|---|
| JP | 2000-066002 | 3/2000 |
| JP | 2004-133040 | 4/2004 |
| JP | 2005-004225 | 1/2005 |

* cited by examiner

*Primary Examiner*—Jordan M. Schwartz
*Assistant Examiner*—James C Jones
(74) *Attorney, Agent, or Firm*—RatnerPrestia

(57) ABSTRACT

An optical transmission device is provided with a first optical member having a negative refraction angle with respect to an incident angle of a beam and a second optical member having a positive refraction angle with respect to the incident angle, wherein the first and second optical members are arranged one each or more in tandem alternatively.

18 Claims, 14 Drawing Sheets

DISPERSION SURFACE

DIAGRAM OF PHOTONIC BANDS IN BRILLOUIN ZONE

OPTICAL TRANSMISSION DEVICE AND LIGHT-RECEIVING MODULE

BACKGROUND OF THE INVENTION

1. Field of the Invention

The present invention relates to an optical transmission device and a light-receiving module which can be used with a waveguide or the like for transmitting lights.

2. Related Art of the Invention

Examples of a waveguide which transmits lights include a channel waveguide which provides a refractive index difference or a reflection portion in the nonparallel direction, e.g., the perpendicular direction, to an optical axis to transmit the lights by repetition of total reflection or partial reflection and a bulk waveguide which provides a plurality of lenses or mirrors on the optical axis to transmit the lights by performing beam conversion. Note herein that the case where the lights are coupled by a single lens or mirror is classified as the bulk waveguide for convenience.

In addition, researches on an optical waveguiding using a photonic band of a photonic crystal of which a refractive index is modulated in a cycle of an optical wavelength level, which applies a phenomenon impossible to achieve with conventional materials, are also active recently.

The channel waveguide using the photonic crystal includes that a periodic defect portion in a channel form that disturbs the cycle is fabricated in a refractive index modulation structure with a uniform cycle that provides a photonic band gap to a light source wavelength to guide the light only to the periodic defect portion in the channel form (for example, see Japanese Patent Laid-Open No. 11-218707).

FIG. 12 illustrates a configuration diagram schematically showing a photonic crystal waveguide disclosed in the Japanese Patent Laid-Open No. 11-218707.

A photonic crystal waveguide 100 is provided with a slab optical waveguide 102 formed on a substrate 101 made of silicon. In a core layer of the slab optical waveguide 102, refractive index changing regions 108 in a cylindrical form having the larger refractive index than that of the core layer surrounding them are arranged in the form of a regular triangle lattice, to constitute a photonic crystal 109. By creating the periodic defect portion, which is not provided with the refractive index changing region 108, in the photonic crystal 109 having the refractive index modulation structure with the uniform cycle, an optical waveguiding region 105 is formed.

Among input light 106 input from an input optical fiber 103 connected to the photonic crystal waveguide 100, only the light with the wavelength which satisfies the Bragg conditions by the refractive index changing region 108 is confined in the optical waveguiding region 105 to be propagated, and is transmitted to an output optical fiber 104 as output light 107.

However, in such a photonic crystal waveguide 100, an incident beam diameter, which allows the beam to be coupled at an incident side in a similar manner to that of the conventional channel waveguide, is limited and a channel width is made to 1 μm or less within a defective width of one to two cycles, so that it is difficult to be coupled as compared with the conventional general waveguide.

In other words, while the photonic crystal waveguide 100 enables optical transmission to a distance at high speed once it is coupled with the optical fiber or the like and the coupling at the light-receiving side is not affected by the coupling at the incident side, it cannot be coupled with the beam with the diameter of 100 μm or more at the incident side due to a core cross-section thereof for high-speed transmission being small.

Meanwhile, it is known that by using the photonic crystal, a negative refraction angle can be achieved because of a crystal structure thereof (for example, see Japanese Patent Laid-Open No. 2005-4225). An optical coupling device is disclosed wherein the above described problem in difficulty of the coupling with the incident beam with the large diameter is solved utilizing an optical property of the negative refraction angle of the photonic crystal (for example, see Japanese Patent Laid-Open No. 2004-133040).

FIG. 13(A) illustrates a schematic diagram showing a refraction phenomenon in a general material, while FIG. 13(B) illustrates a schematic diagram showing the refraction phenomenon in the photonic crystal when the optical beam enters from the air.

The device, as represented by a lens or a prism, which controls the propagation direction of the optical beam utilizes the so-called refraction phenomenon where the propagation direction of the beam is changed in accordance with a difference between the refractive index of external environment (generally, the air) and that of a device material. In this case, a degree of the refraction angle with respect to the incident angle is determined by the ratio of the refractive indexes of the materials on both sides of an interface (Snell's law). For example, as illustrated in FIG. 13(A), if a medium 111 (approximately 1.5 for a general glass) is larger than a medium 110 (1 for the air) in terms of the refractive index, the refraction angle is then smaller than the incident angle. That is, the refraction angle has the same sign with that of the incident angle.

In contrast, when the photonic crystal is used, the crystal structure thereof enables to achieve the refraction angle which is impossible to achieve by a general optical system. As illustrated in FIG. 13(B), the beam entered from the air with the refractive index of 1 into a photonic crystal 112 can be refracted to the same side with the incident beam, i.e., at the negative refraction angle. By controlling the crystal structure of the photonic crystal 112 using structural parameters, such a negative refraction angle can be achieved.

FIG. 14 is a schematic diagram showing a trail of the light in the optical coupling device of Japanese Patent Laid-Open No. 2004-133040, which constitutes the bulk waveguide utilizing the optical property of the photonic crystal, i.e., the negative refraction angle.

A photonic crystal 120 constituting this optical coupling device is the photonic crystal having the band with a negative inclination with respect to the light source wavelength due to a return, which propagates the light in the direction where the refraction angle is negative with respect to the incident beam.

The light entered from the light source at a point A into the photonic crystal 120 is refracted in the negative refraction angle direction to be propagated within the photonic crystal 120, and is also refracted in the negative refraction angle direction to be propagated when going out therefrom. As illustrated in FIG. 14, by adjusting the refraction angle of the photonic crystal 120 so that the entered refracted beams intersect within the photonic crystal 120, the light emitted from the light source at the point A can be condensed at a point B in the air. The light from the light source at the point A is coupled to an optical fiber 121 by arranging an end face of the optical fiber 121 at the condensing point B.

SUMMARY OF THE INVENTION

The present invention is directed, to provide the optical transmission device and the light-receiving module, easy to fabricate and which can be coupled with the incident beam with the large diameter to guide the light to the arbitrary light-receiving position.

The 1st aspect of the present invention is an optical transmission device having an optical axis, said optical transmission device comprising:

a first optical member having a negative refraction angle with respect to an incident angle of a beam; and a second optical member having a positive refraction angle with respect to the incident angle, wherein the first optical member and the second optical member are arranged along said optical axis.

Further, the 2nd aspect of the present invention is the optical transmission device according to the 1st aspect of the present invention, wherein the beam is a diffused light, and wherein the first optical member and the second optical member have optical path lengths equal to each other and absolute values of group velocities of the beam equal to each other.

Further, the 3rd aspect of the present invention is the optical transmission device according to the 1st aspect of the present invention, wherein the beam is a collimated light, and wherein the group velocity of the beam in the first optical member and the group velocity of the beam in the second optical member vary depending on a distance from the optical axis.

Further, the 4th aspect of the present invention is the optical transmission device according to the 3rd aspect of the present invention, wherein the absolute values of the group velocity of the beam in the first optical member and the group velocity of the beam in the second optical member do not decrease depending on the distance from the optical axis.

Further, the 5th aspect of the present invention is the optical transmission device according to the 1st aspect of the present invention, wherein the beam is the collimated light, and wherein a refractive index of the first optical member and a refractive index of the second optical member vary depending on the distance from the optical axis.

Further, the 6th aspect of the present invention is the optical transmission device according to the 1st aspect of the present invention, wherein the beam is the collimated light, and wherein an incident end is constituted of the first optical member having a curved surface.

Further, the 7th aspect of the present invention is the optical transmission device according to the 6th aspect of the present invention, wherein the curved surface is convex.

Further, the 8th aspect of the present invention is the optical transmission device according to the 7th aspect of the present invention, wherein, at an incident point to the curved surface on the outermost periphery of the beam, an angle between the optical axis and a projection component of the beam to a plane containing a perpendicular and the optical axis at the incident point is (1) of a different sign with that of an angle between the perpendicular and the optical axis or (2) of a non-different sign with that of the angle between the perpendicular and the optical axis and the absolute value thereof being smaller than the absolute value of the angle between the perpendicular and the optical axis.

Further, the 9th aspect of the present invention is the optical transmission device according to the 1st aspect of the present invention, wherein at least the first optical member is constituted of a photonic crystal.

Further, the 10th aspect of the present invention is the optical transmission device according to the 1st aspect of the present invention, wherein a phase velocity related to a wavelength of the beam in the first optical member is substantially equal to the phase velocity related to the wavelength of the beam in the second optical member.

Further, the 11th aspect of the present invention is the optical transmission device according to the 1st aspect of the present invention, wherein the absolute values of the group velocities of the beam are equal to each other in the first and second optical members, and wherein at least the first optical member or the second optical member is plural in number and the first optical member or the second optical member includes that with a different thickness.

Since the first optical member has the negative refraction angle and the second optical member has the positive refraction angle, an entered diffused beam is propagated while condensed in the first optical member and diffused in the second optical member in a configuration where they are aligned in tandem alternatively. The optical path length for condensation can be set longer than the optical path length for diffusion by differentiating the thicknesses of the first and second optical members, so that a beam diameter can be made smaller as the beam is propagated within the optical transmission device. Along therewith, an axial misalignment at an outgoing position can be made smaller even when an incident light is angularly misaligned.

Further, the 12th aspect of the present invention is the optical transmission device according to the 11th aspect of the present invention, wherein the thickness of the first optical member and/or the second optical member vary along the optical axis direction.

Further, the 13th aspect of the present invention is the optical transmission device according to the 11th aspect of the present invention, wherein the total of the thickness of the first optical member is greater than the total of the thickness of the second optical member.

Further, the 14th aspect of the present invention is the optical transmission device according to the 1st aspect of the present invention, wherein a third optical member, which is different from both the first optical member and the second optical member, is arranged between a pair of the adjacent first and second optical members.

Further, the 15th aspect of the present invention is a light-receiving module comprising:

the optical transmission device according to the 1st aspect of the present invention, wherein the incident end and an outgoing end are constituted of the first optical member; and a light-receiving section arranged in the vicinity of the outgoing end of the optical transmission device.

Further, the 16th aspect of the present invention is the light-receiving module according to the 15th aspect of the present invention, wherein a beam diameter at the incident end of the optical transmission device is different from the beam diameter at the outgoing end of the optical transmission device.

Further, the 17th aspect of the present invention is the light-receiving module according to the 16th aspect of the present invention, wherein the beam diameter varies along the optical axis direction.

Further, the 18th aspect of the present invention is the light-receiving module according to the 17th aspect of the present invention, wherein the beam diameter substantially decreases along the optical axis direction.

Further, the 19th aspect of the present invention is an optical transmission device according to the 1st aspect of the present invention, wherein said first optical member is one of a plurality of first optical members;

said second optical member is one of a plurality of second optical members; and said first optical members and said second optical members are alternately arranged along said optical axis.

While the beam diameter at the outgoing end can be made smaller than the beam diameter at the incident end, the axial misalignment at the outgoing position can be made smaller even when the incident light is angularly misaligned.

According to the present invention, there can be provided the optical transmission device and the light-receiving module, easy to fabricate and which can be coupled with the incident beam with the large diameter to guide the light to the arbitrary light-receiving position.

Figure 1:
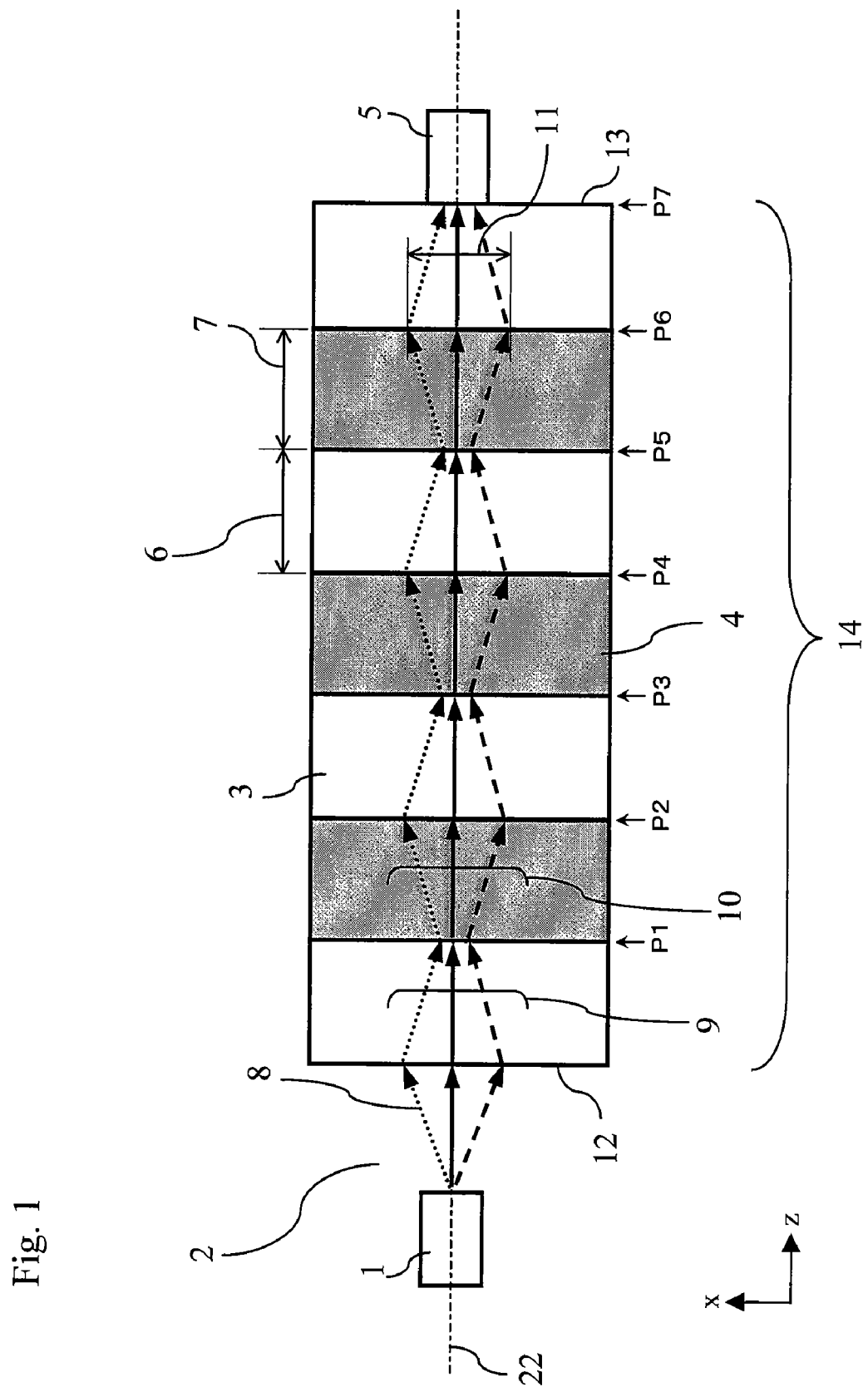
FIG. 1 illustrates a schematic configuration diagram of a light-receiving module according to a first embodiment of the present invention.

DESCRIPTION OF SYMBOLS 1, 41 light source
2, 42 free space
3, 23, 60, 72 negative refractive index photonic crystal
4, 24, 73 positive refractive index photonic crystal
5 light-receiving section
6, 25, 43, 61, 74 optical path length of negative refractive index photonic crystal
7, 26, 44, 53, 75 optical path length of positive refractive index photonic crystal
8 incident light
9, 27, 33, 45, 54, 62, 71, 80 condensed light
10, 28, 34, 46, 55, 63, 70, 79 diffused light
11, 32, 35, 50, 59, 68, 77, 81 beam diameter
12, 29, 47, 56, 64 incident end
13, 30, 48, 57, 65, 76 outgoing end
14, 31, 49, 58, 67, 78, 84 transmission section
15 angularly misaligned incident light
16 collimated incident light
17, 51 graded negative refractive index photonic crystal
18, 52 graded positive refractive index photonic crystal
19 angularly misaligned collimated incident light
22 optical axis
66 curved surface
69, 82 perpendicular
83 optical filter
100 photonic crystal waveguide
101 substrate
102 slab optical waveguide
103 input optical fiber
104 output optical fiber
105 optical waveguiding region
106 input light
107 output light
108 refractive index changing region
109, 112, 120 photonic crystal
110, 111 medium
121 optical fiber

PREFERRED EMBODIMENTS OF THE INVENTION

However, in the case of the optical coupling device with the configuration of Japanese Patent Laid-Open No. 2004-133040, it has been difficult to fabricate the optical coupling device which guides the light to an arbitrary light-receiving position.

The details of this problem are described below.

Figure 14:
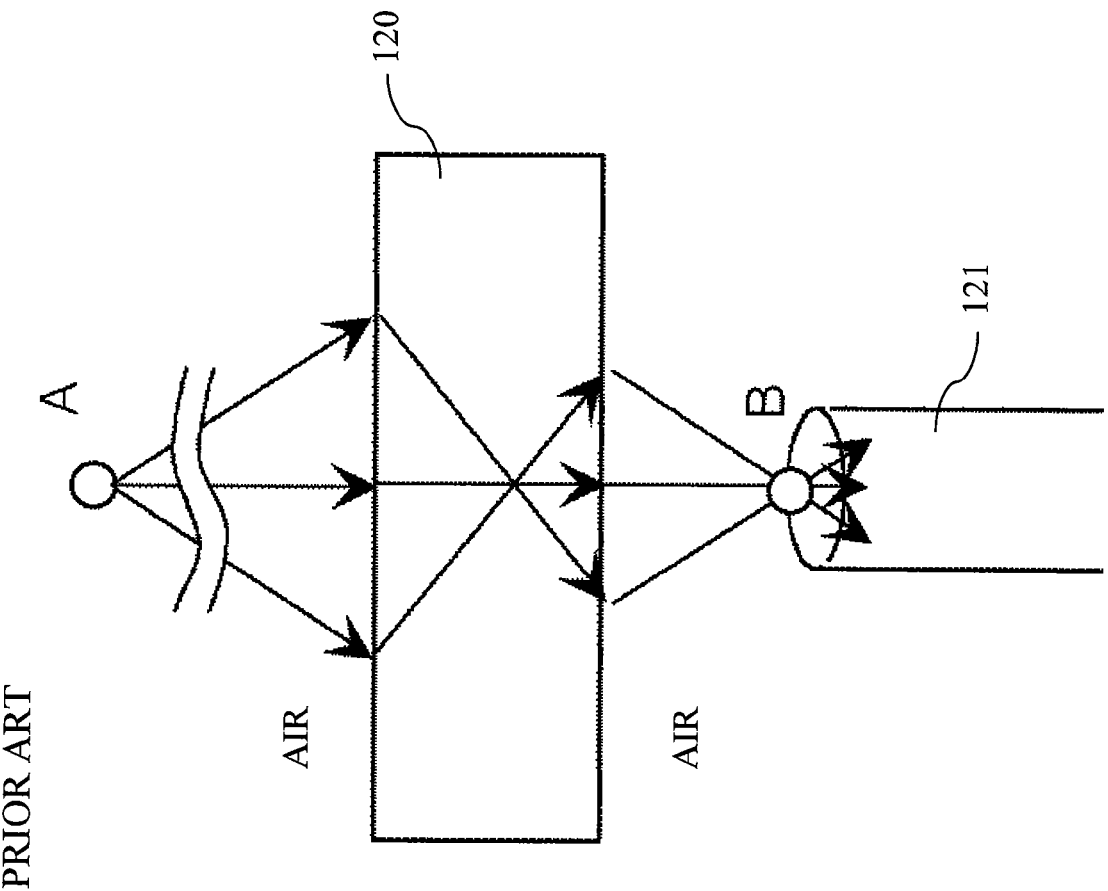
FIG. 14 is a schematic diagram showing a trail of the light in a conventional optical coupling device which utilizes an optical property of the photonic crystal, i.e., a negative refraction angle.

The optical coupling device illustrated in FIG. 14 controls a state of the beam at an outgoing end of the photonic crystal 120 using the refraction angle and an optical path length of the photonic crystal 120. Although the refraction angle is determined by a design of the photonic crystal 120 and any refraction angle can be theoretically achieved by the structural design, the actual fabrication is limited by the constraints due to the material or a processing method of the photonic crystal, resulting in the fabrication being either easy or difficult depending on the refraction angle to be achieved.

That is, in order to manufacture the optical coupling device which can guide the light to the arbitrary light-receiving position with the optical coupling device in the configuration illustrated in FIG. 14, the photonic crystal must be structurally designed so as to have a predetermined refraction angle to set the arbitrary position as the light-receiving position, and further the predetermined refraction angle may cause the difficulty in the fabrication in accordance with the structural design.

Hereinafter, embodiments of the present invention will be described by reference to the drawings.

First Embodiment

FIG. 1 illustrates a schematic configuration diagram of a light-receiving module according to a first embodiment of the present invention.

The configuration and operation of the light-receiving module of the first embodiment are described hereinbelow by primarily referring to FIG. 1.

The light-receiving module of the first embodiment is provided with a transmission section 14 and a light-receiving section 5.

The transmission section 14 is provided with a plurality of negative refractive index photonic crystals 3 having a negative refraction angle with respect to an incident angle of an incident light 8 from a light source 1 isolated by a free space 2 and a plurality of positive refractive index photonic crystals 4 having a positive refraction angle with respect to the incident angle. The negative and positive refractive index photonic crystals 3 and 4 are arranged in tandem alternatively on an optical axis 22 of the transmission section 14 so that the negative refractive index photonic crystals 3 are located at both an incident end 12 and an outgoing end 13 of the transmission section 14.

The light-receiving section 5 is disposed in the vicinity of or in contact with the outgoing end 13 of the transmission section 14 so that the optical axis of the light-receiving section 5 overlaps with the optical axis 22 of the transmission section 14.

In this case, since the light source 1 is such as an end face of an optical fiber and is disposed in the vicinity of the incident end 12 of the transmission section 14, the incident light 8 from the light source 1 is a diffused light.

Note that the transmission section 14 corresponds to an example of the optical transmission device of the present invention. In addition, the negative refractive index photonic crystal 3 corresponds to an example of a first optical member of the present invention while the positive refractive index photonic crystal 4 corresponds to an example of a second optical member of the present invention. The second optical member of the present invention does not include a gas, such as the air.

Although a beam diameter 11 increases and decreases alternatively in the propagation direction as illustrated in FIG. 1, an optical path length 6 of the negative refractive index photonic crystal 3 and an optical path length 7 of the positive refractive index photonic crystal 4 are designed so that a maximum value of the beam diameter 11 is maintained substantially uniform in the propagation direction. FIG. 1 illustrates an example where absolute values of group velocities of the negative and positive refractive index photonic crystal 3 and 4 are equal to each other, in which case the respective optical path lengths of the negative and positive refractive index photonic crystal 3 and 4 would be equal to each other.

Figures 2A, 2B:
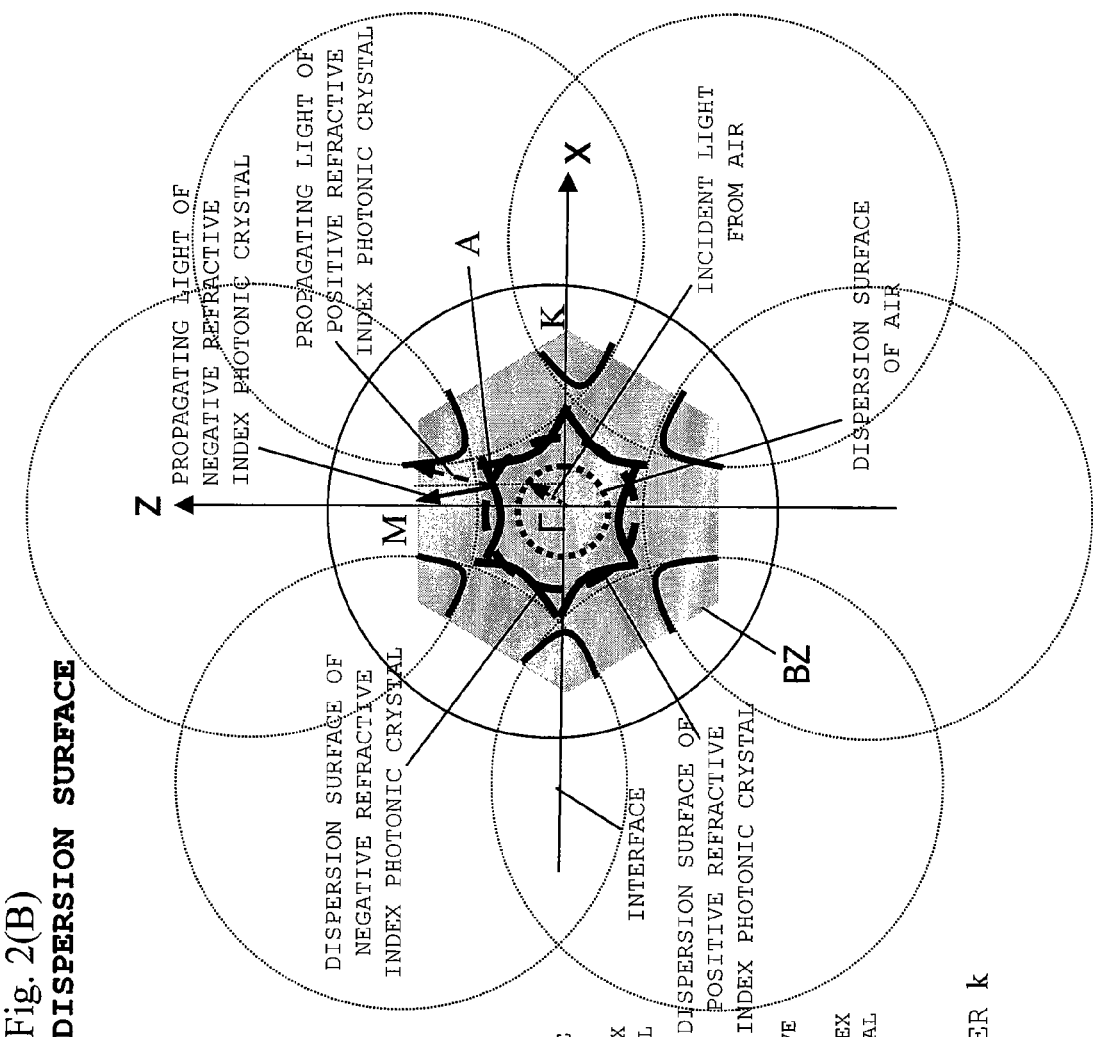
FIG. 2(A) illustrates a schematic diagram of photonic bands of negative and positive refractive index photonic crystals according to the first embodiment of the present invention.
FIG. 2(B) illustrates a schematic diagram of dispersion surfaces of the negative and positive refractive index photonic crystals according to the first embodiment of the present invention.

Here, referring to FIGS. 2(A) and 2(B) as well, the configuration and operation of the light-receiving module of the first embodiment are described in more detail while focusing on an operation principle of the light-receiving module of the first embodiment.

FIG. 2(A) illustrates a schematic diagram of photonic bands of the negative refractive index photonic crystal having the negative refraction angle and the positive refractive index photonic crystal having the positive refraction angle, while FIG. 2(B) illustrates a schematic diagram of dispersion surfaces of the negative and positive refractive index photonic crystals.

First, behavior of a propagating light is described in the case where the negative and positive refractive index photonic crystals form a photonic band structure of a triangle lattice.

Dispersion curves in the Brillouin zone of the photonic bands of the negative and positive refractive index photonic crystals and of the air in the free space from the light source to the negative refractive index photonic crystal at the incident end are drawn as in FIG. 2(A). Note that the solid line represents the negative refractive index photonic crystal, the dashed line represents the positive refractive index photonic crystal, and the dotted line represents the air.

Referring to FIG. 2(A), phase velocities (inclination of a straight line connecting a point Γ and a point on a dispersion curve) of the negative refractive index photonic crystal, the positive refractive index photonic crystal, and the air are all positive at a light source wavelength $\omega_1$ in both K and M directions in the Brillouin zone of the triangle lattice, while the group velocity (inclination of a tangent at a point on the dispersion curve) is negative as for the negative refractive index photonic crystal and is positive as for the positive refractive index photonic crystal and the air.

In other words, at the light source wavelength $\omega_1$, the traveling direction of a light-wave phase and the propagating direction of the beam are opposite as for the negative refractive index photonic crystal, while the traveling direction of the light-wave phase and the propagating direction of the beam are the same as for the positive refractive index photonic crystal and the air.

This is why the negative refractive index photonic crystal has the negative refraction angle.

Namely, the negative refractive index photonic crystal causes refraction in the direction with respect to a perpendicular of the interface opposite to that of the positive refractive index photonic crystal and of the air.

The dispersion surfaces in the Brillouin zone of the negative refractive index photonic crystal, the positive refractive index photonic crystal, and the air at the light source wavelength $\omega_1$ are drawn as in FIG. 2(B). Note that the solid line represents the negative refractive index photonic crystal, the dashed line represents the positive refractive index photonic crystal, the dotted line represents the air, and the thin dotted line represents the dispersion surface at each inverse lattice points of the negative refractive index photonic crystal drawn to help illustrating the dispersion surface of the negative refractive index photonic crystal in the Brillouin zone.

Referring to FIG. 2(B), the dispersion surfaces of the air and the positive refractive index photonic crystal are circular, while the dispersion surface of the negative refractive index photonic crystal is constituted of a plurality of arcs curved inwardly in the M or K direction and a closed curve having projections in the K direction.

When the light axially misaligned from the z direction enters from the air to the first negative refractive index photonic crystal as illustrated in FIG. 2(B), an x component is saved on the basis of the law of momentum conservation because all the interfaces between the negative and positive refractive index photonic crystals are perpendicular to the optical axis. Therefore, a gradient (the direction of the perpendicular of the dispersion surface) at a point where the x component on the dispersion surface of the negative refractive index photonic crystal is saved, i.e., at a point A on the closed curve described above, would be the direction of propagation, i.e., of refraction, in the negative refractive index photonic crystal.

The perpendicular direction of the dispersion surface of the negative refractive index photonic crystal and the perpendicular direction of the dispersion surface of the positive refractive photonic crystal at the point A are axisymmetric to each other with respect to the z direction. For this reason, the dispersed incident light 8 turns into a condensed light 9 in the negative refractive index photonic crystal 3 and into a diffused light 10 in the positive refractive index photonic crystal 4, as illustrated in FIG. 1.

In this manner, if the perpendicular direction of the dispersion surface of the negative refractive index photonic crystal and the perpendicular direction of the dispersion surface of the positive refractive index photonic crystal at the point A are axisymmetric to each other with respect to the z direction, angles of condensation and diffusion inside the respective negative and positive refractive index photonic crystals are equal, making it possible to propagate the beam to an output end while maintaining the maximum value of the beam diameter being substantially uniform by making the optical path lengths of the negative and positive refractive index photonic crystals equal to each other.

It should be noted that, as described above, the phase velocity at the light source wavelength of the negative refractive index photonic crystal and the phase velocity at the light source wavelength of the positive refractive index photonic crystal can be made equal to each other by causing the x components on the dispersion surfaces of the respective negative and positive refractive index photonic crystals equal to the x component of the incident light at the point A, so that the Fresnel reflection at the interface can be prevented.

In addition, although the photonic crystal does not particularly need to be used as a positive refractive index material when the photonic band which the positive refractive index photonic crystal uses is at a lower frequency than that of the lowest band edge, using the photonic crystal allows to use the photonic band of the positive group velocity at the higher frequency than that of the lowest band edge.

In this manner, by arranging the negative refractive index photonic crystals 3 having the negative refraction angle and the positive refractive index photonic crystals 4 having the positive refraction angle in tandem alternatively on the optical axis 22 of the transmission section 14 to repeat a condensing optical system and a diffusing optical system, the beam can be transmitted without using a core which has been necessary for the channel waveguide. Moreover, it can be readily coupled with the large-diameter incident light because of the absence of the core.

In addition, by establishing such a configuration of the transmission section 14 where the negative refractive index photonic crystals 3 and the positive refractive index photonic crystals 4 are arranged in tandem alternatively, the transmission section 14 can be readily fabricated where the position of the light-receiving section 5 with respect to the light source 1 can be arranged arbitrarily.

For example, in FIG. 1, each of the negative and positive refractive index photonic crystals 3 and 4 to be used has the same absolute value of the group velocity and the same optical path length, in which case the state of condensation similar to that at a point P7 on the Z axis where the light-receiving section 5 is disposed reappears at each of points P1, P3, and P5 on the optical axis 22. Therefore, although the negative and positive refractive index photonic crystals 3 and 4 totaling seven sheets configure the transmission section 14 in FIG. 1, the light-receiving section 5 can be disposed at the position P3 with the configuration of three sheets from the incident end 12 of FIG. 1 or can be disposed at the position P5 with the configuration of five sheets from the incident end 12, for example, to receive the light.

Moreover, although the negative and positive refractive index photonic crystals 3 and 4 having the equal optical path length are arranged in tandem in FIG. 1, the transmission section 14 can be constituted in which the light-receiving section 5 can be disposed at an arbitrary position instead of the limited position, such as P3, P5, or P7, by arranging the photonic crystals in tandem having the same photonic crystal structure as above and a thickness different from above. Since the same photonic crystal structure results in the same refraction angle regardless of the thickness, the condensing position can be controlled to be disposed at an arbitrary position by varying thicknesses.

Therefore, by preparing the negative and positive refractive index photonic crystals having the identical photonic crystal structure, respectively, and by arranging them in tandem with the thickness being respectively adjusted, the transmission section can be fabricated with the light-receiving section being disposed at a desired position with respect to the light source. Since only the thickness is adjusted while the photonic crystals having the identical photonic crystal structure being used, the transmission section, which can readily condense the light to the desired position, can be fabricated without the structural design of the photonic crystal being newly performed.

Second Embodiment

Figure 3:
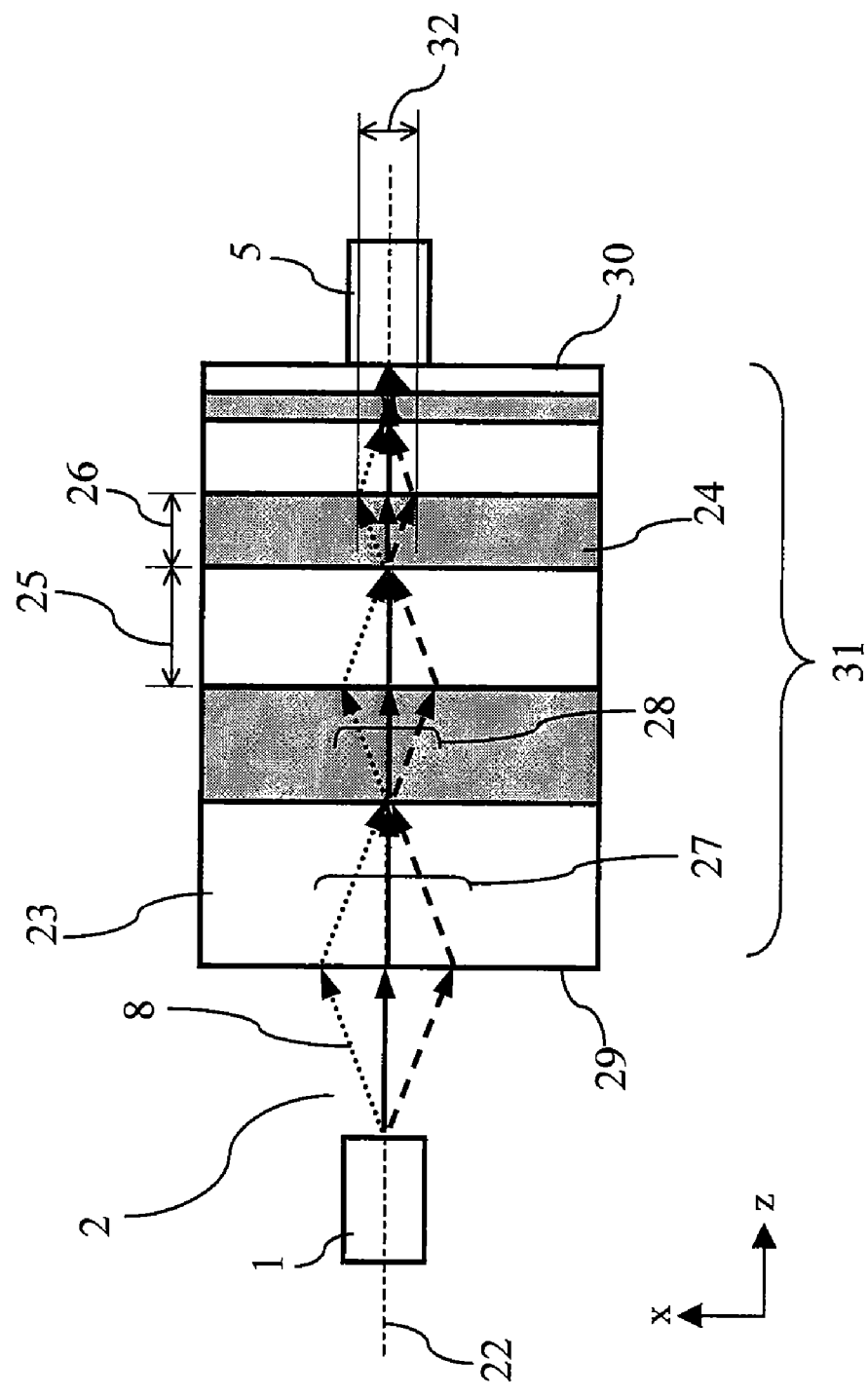
FIG. 3 illustrates a schematic configuration diagram of the case where a diffused light with no angular misalignment enters into a light-receiving module according to a second embodiment of the present invention.
Figure 4:
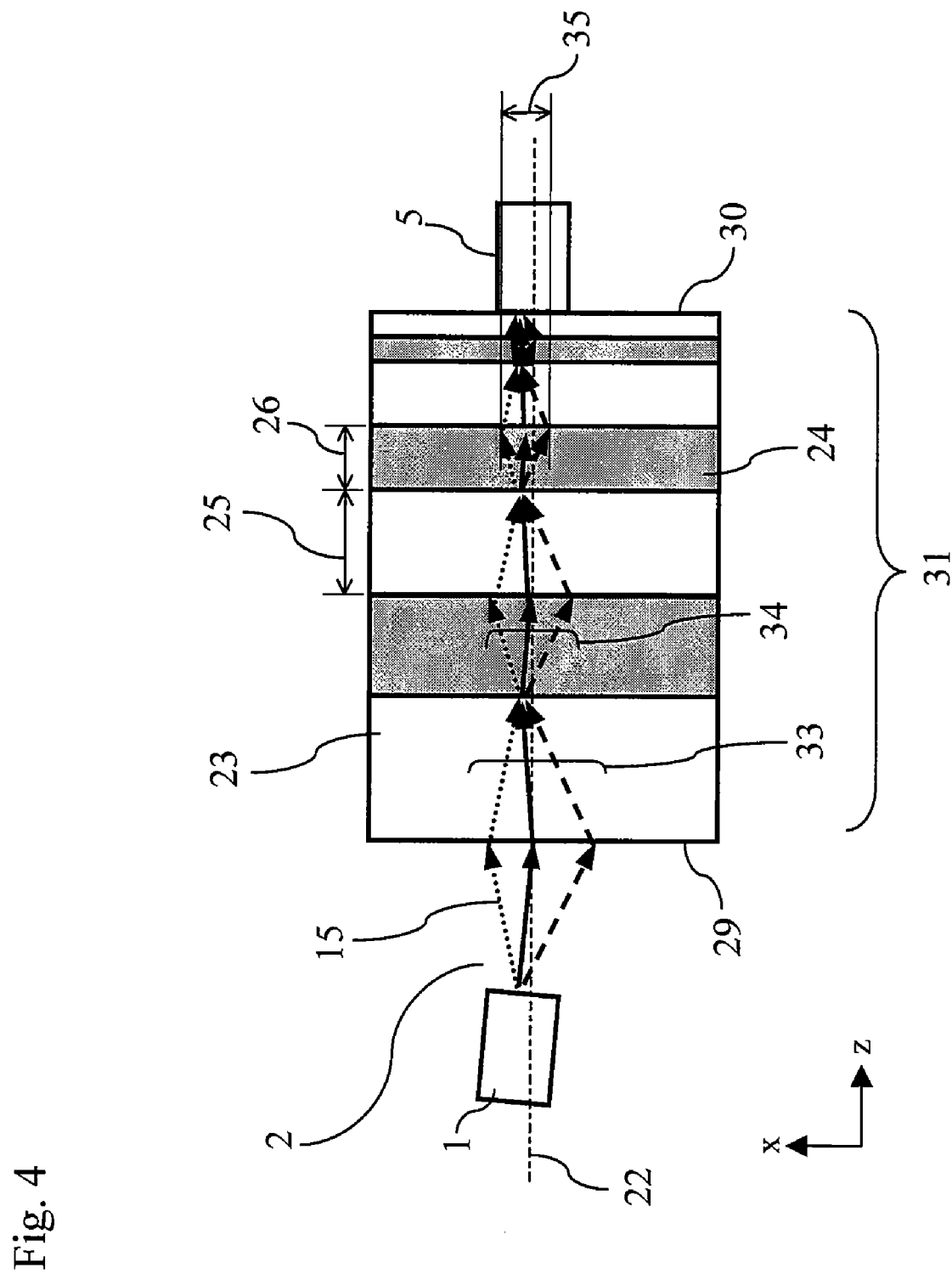
FIG. 4 illustrates a schematic configuration diagram of the case where the diffused light with angular misalignment enters into the light-receiving module according to the second embodiment of the present invention.

FIGS. 3 and 4 illustrate schematic configuration diagrams of the light-receiving module according to a second embodiment of the present invention. FIG. 3 illustrates the case where the incident light is not angularly misaligned, and FIG. 4 illustrates the case where the incident light enters while being angularly misaligned. In the respective drawings, like reference numerals denote like components as those in FIG. 1.

The configuration and operation of the light-receiving module of the second embodiment are described hereinbelow by primarily referring to FIGS. 3 and 4.

As compared to the light-receiving module of the first embodiment where the negative and positive refractive index photonic crystals 3 and 4 having the same optical path length are arranged in tandem alternatively, the light-receiving module of the second embodiment is different in that negative refractive index photonic crystals 23 and positive refractive index photonic crystals 24 with varying thicknesses are arranged in tandem alternatively.

In a transmission section 31 of the second embodiment, the negative and positive refractive index photonic crystals 23 and 24 with the thicknesses being respectively decreased from an incident end 29 to an outgoing end 30 are arranged in tandem alternatively on the optical axis 22 of the transmission section 31 so that the negative refractive index photonic crystals 23 are located at both the incident end 29 and the outgoing end 30 of the transmission section 31.

Note that the negative refractive index photonic crystal 23 corresponds to an example of the first optical member of the present invention while the positive refractive index photonic crystal 24 corresponds to an example of the second optical member of the present invention. In addition, the transmission section 31 corresponds to an example of the optical transmission device of the present invention wherein the thickness of the first optical member and the thickness of the second optical member vary along the direction of the optical axis.

The second embodiment is to vary the maximum value of a beam diameter 32 which increases and decreases between the incident end 29 and the outgoing end 30 of the transmission section 31 by varying an optical path length 25 of a plurality of negative refractive index photonic crystals 23 and an optical path length 26 of a plurality of positive refractive index photonic crystals 24.

The light-receiving module of the second embodiment illustrated in FIGS. 3 and 4 shows the example where the beam diameter decreases toward the outgoing end 30 compared to that at the incident end 29, corresponding to an example of the light-receiving module of the present invention where the beam diameter varies so that it substantially decreases along the direction of the optical axis.

In the case where the absolute values of the refraction angles of the negative and positive refractive index photonic crystals 23 and 24 are equal to each other, the total of the optical path lengths 25 of the respective negative refractive index photonic crystals is made larger than the total of the optical path lengths 26 of the respective positive refractive index photonic crystals in order to make the beam diameter at the outgoing end 30 smaller than the beam diameter at the incident end 29.

When the negative and positive refractive index photonic crystals with the equal absolute value of the refraction angle are used, a relationship of Formula 1 must be true in order to make the beam diameter at the outgoing end smaller than the beam diameter at the incident end, where a beam radius at the incident end is a, the total of the optical path lengths of the negative refractive index photonic crystals is Ln, the total of the optical path lengths of the positive refractive index photonic crystals is Lp, and the refraction angle is θ.

$$|a - \tan\theta \times Ln + \tan\theta \times Lp| < a \quad \text{[Formula 1]}$$

From Formula 1, the ratio of Ln to Lp must satisfy Formula 2.

$$1 < Ln/Lp < 2a/\tan\theta + 1 \quad \text{[Formula 2]}$$

Since 2a/tan θ+1 varies within the range from 1 to infinity, it is sufficient to set the total Ln of the optical path lengths of the negative refractive index photonic crystals larger than the total Lp of the optical path lengths of the positive refractive index photonic crystals in order to make the beam diameter at the outgoing end smaller than that of the incident end.

If the optical path length varies to be shortened along with a propagation sequence as illustrated in FIG. 3, the maximum value of the beam diameter 32 would be gradually smaller as a propagation distance increases.

In contrast to FIG. 3 which illustrates the case where the angularly aligned incident light 8 enters, the negative refractive index photonic crystal 23 serves to correct the angular misalignment if an angularly misaligned incident light 15 enters as illustrated in FIG. 4. As well as the maximum value of the beam diameter 35 being decreased toward the outgoing end 30, the axial misalignment of the outgoing light can be decreased even when the incident light is angularly misaligned. Naturally, it is also possible to design so that the variation in the light-receiving position is to be zero.

As described above, the light-receiving module of the second embodiment is constituted of the negative and positive refractive index photonic crystals 23 and 24 with the optical path lengths which vary from the incident end 29 to the outgoing end 30 arranged in tandem alternatively, and thus the beam diameter at the outgoing end can be made smaller than the beam diameter at the incident end, resulting in the large-diameter incident beam being readily coupled with the light-receiving section having small light-receiving area without considering the static or dynamic angular misalignment of the incident light.

Obviously, it is similarly effective to the relative angular misalignment of the incident light due to the angular misalignment to the light-receiving section 5 when the transmission section 31, including the negative and positive refractive index photonic crystals 23 and 24 being arranged in tandem alternatively, and the light-receiving section are integrated.

Third Embodiment

Figure 5:
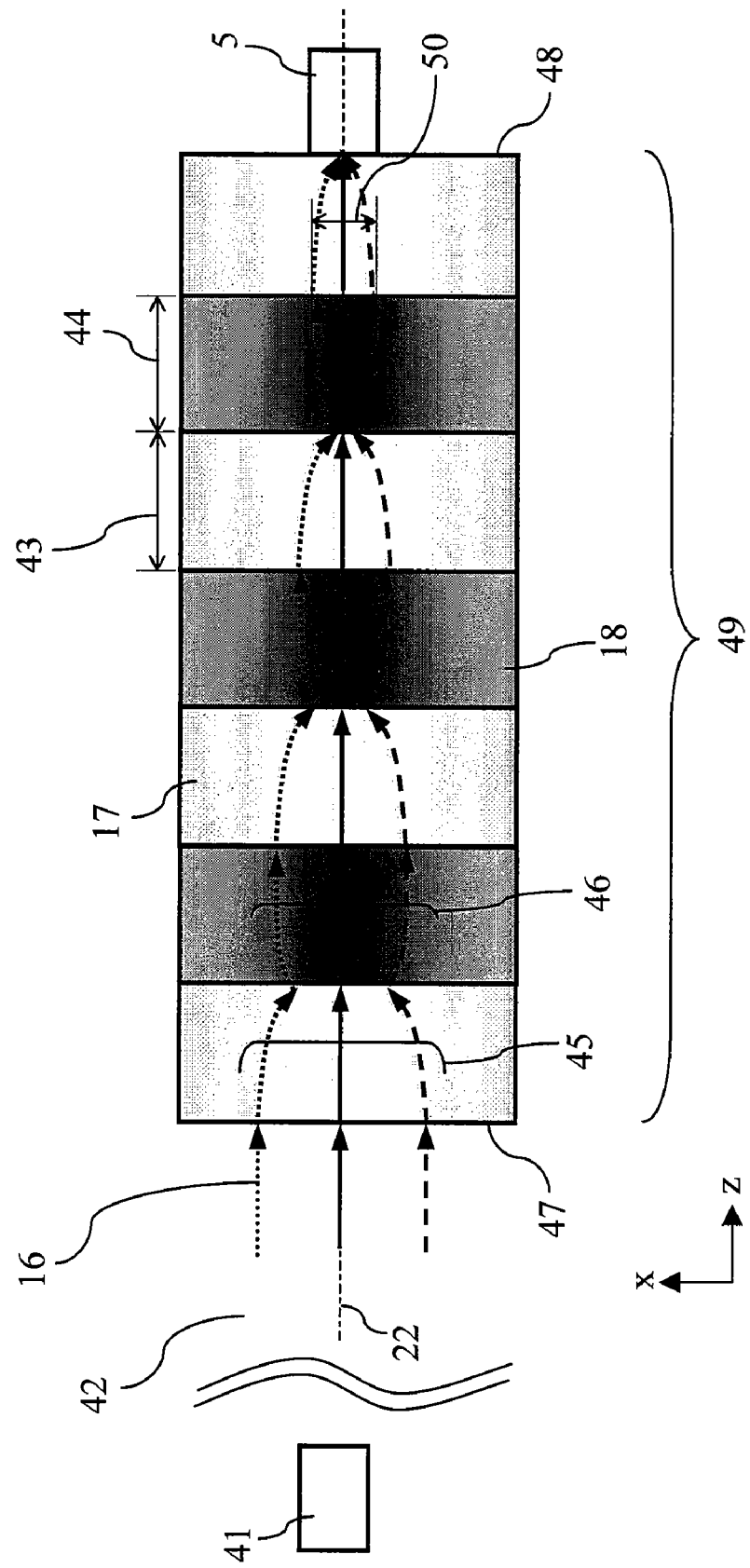
FIG. 5 illustrates a schematic configuration diagram of the case where a collimated light with no angular misalignment enters into the light-receiving module according to a third embodiment of the present invention.

FIG. 5 illustrates a schematic configuration diagram of the light-receiving module according to a third embodiment of the present invention. Like reference numerals denote like components as those in FIG. 1.

The configuration and operation of the light-receiving module of the third embodiment are described hereinbelow by primarily referring to FIG. 5.

The light-receiving module of the third embodiment is provided with a transmission section 49 and the light-receiving section 5.

The transmission section 49 is provided with a plurality of graded negative refractive index photonic crystals 17 having the negative refraction angle and a plurality of graded positive refractive index photonic crystals 18 having the positive refraction angle, which are arranged in tandem alternatively on the optical axis 22 of the transmission section 49 so that the graded negative refractive index photonic crystals 17 are disposed at both an incident end 47 and an outgoing end 48. The graded negative refractive index photonic crystal 17 and the graded positive refractive index photonic crystal 18 have the graded group velocities, respectively, in which the absolute value of the group velocity increases in proportion substantially to an inverse number of the square of the distance from the optical axis 22.

The light-receiving section 5 is disposed so that the optical axis of the light-receiving section 5 overlaps with the optical axis 22 of the transmission section 49 at the position in the vicinity of or adjacent to the outgoing end 48 of the transmission section 49.

In addition, the transmission section 49 is isolated from a light source 41 by a free space 42. In this case, the light source 41 is disposed at a distance from the transmission section 49 as in the case of communication between buildings, and the incident light from the light source 41 is a collimated incident light 16.

Note that the transmission section 49 corresponds to an example of the optical transmission device of the present invention. In addition, the graded negative refractive index photonic crystal 17 corresponds to an example of the first optical member of the present invention and the graded positive refractive index photonic crystal 18 corresponds to an example of the second optical member of the present invention. Moreover, the collimated incident light 16 corresponds to an example of a collimate light of the present invention.

The group velocity of the graded negative refractive index photonic crystal 17 decreases as the distance from the optical axis 22 increases because the group velocity thereof is negative, while the group velocity of the graded positive refractive index photonic crystal 18 increases as the distance from the optical axis 22 increases because the group velocity thereof is positive.

In the graded positive refractive index photonic crystal 18, the group velocity increases in proportion substantially to the inverse number of the square of the distance from the optical axis, i.e., the refractive index thereof decreases in a parabolic curve. For this reason, the propagating light propagates while meandering along the optical axis 22 as in a GRIN lens, and is gradually condensed with respect to the diffused beam in the case where a cycle of the optical path length is approximately ¼ of that of the meander as illustrated in FIG. 5.

In contrast, in the graded negative refractive index photonic crystal 17, the group velocity decreases in proportion substantially to the inverse number of the square of the distance from the optical axis 22, i.e., the refractive index thereof increases in the parabolic curve. Therefore, a curvature radius of the arc of the dispersion surface of the graded negative refractive index photonic crystal of FIG. 2 in the M direction increases, i.e., the depression thereof becomes small, as being separated away from the optical axis 22, resulting in the propagating light in the graded negative refractive index photonic crystal 17 being directed more toward the optical axis 22 direction as being separated away from the optical axis 22. For this reason, the propagating light propagates while meandering along the optical axis 22 as in the GRIN lens, and is gradually condensed with respect to the diffused beam in the case where the cycle of the optical path length is approximately ¼ of that of the meander as illustrated in FIG. 5.

Note that shading of the graded negative refractive index photonic crystal 17 and the graded positive refractive index photonic crystal 18 of FIG. 5 represents the grades of the refractive indexes. A dark shaded area represents a portion with the large refractive index while a light shaded area represents a portion with the small refractive index.

In the light-receiving module of the third embodiment, while an optical path length 43 of each graded negative refractive index photonic crystals and an optical path length 44 of each graded positive refractive index photonic crystals are equal to each other, a distribution factor of the refractive index is smaller in the graded positive refractive index photonic crystal 18 than that in the graded negative refractive index photonic crystal 17. In other words, an amount of change in the refractive index in accordance with the distance from the optical axis 22 is more moderate in the graded positive refractive index photonic crystal 18 than in the graded negative refractive index photonic crystal 17.

Since the incident light is the collimated incident light 16 as illustrated in FIG. 5, the beam is condensed within the graded negative refractive index photonic crystal 17 which is positioned first at the incident end 47, refracted in the diffusion direction at the interface, and then collimated within the graded positive refractive index photonic crystal 18 which is positioned second. Thereafter, with the graded negative refractive index photonic crystals 17 and the graded positive refractive index photonic crystals 18 which are positioned third or later alternatively in tandem, the beam is condensed and diffused repeatedly as described above.

Here, since the distribution factor of the refractive index is smaller in the graded positive refractive index photonic crystal 18 than in the graded negative refractive index photonic crystal 17, the maximum value of the beam diameter 50 of the light propagating in the transmission section 49 becomes smaller as it travels toward the outgoing end 48, allowing the light-receiving section 5 with the small light-receiving area being readily coupled.

Note herein that the Fresnel reflection at the respective interfaces can be reduced by setting the phase velocities at the respective interfaces equal to each other for the graded negative refractive index photonic crystal 17 and for the graded positive refractive index photonic crystal 18. In the present invention, "the phase velocities are substantially equal to each other" means that the phase velocities are within a range considered to be equal to each other in view of a conventionally accepted idea.

In addition, a graded positive refractive index material forming the graded positive refractive index photonic crystal 18 is not limited to the photonic crystal, but includes any material with the positive refractive index, such as resin.

The transmission section 49 illustrated in FIG. 5 uses the graded positive refractive index photonic crystals 18 having smaller distribution factor of the refractive index than that of the graded negative refractive index photonic crystal 17 so as to constitute the maximum value of the beam diameter 50 of the light propagating within the transmission section 49 becoming smaller as it travels toward the outgoing end 48 using the photonic crystals having the same optical path length with each other. However, it can be also constituted so that the maximum value of the beam diameter of the light becomes smaller as it travels toward the outgoing end by using the graded negative refractive index photonic crystals and the graded positive refractive index photonic crystals having the same distribution factor of the refractive index and constituting them so that the optical path length of the graded negative refractive index photonic crystal is longer.

Although, in the transmission section 49 of the third embodiment, the absolute value of the group velocity is constituted to increase in proportion substantially to the inverse number of the square of the distance from the optical axis 22 for the graded negative refractive index photonic crystal 17 and for the graded positive refractive index photonic crystal 18, respectively, the absolute value of the group velocity is not limited to that uniformly increases as the distance from the optical axis increases, but it is sufficient as long as the absolute value of the group velocity does not decrease as the distance from the optical axis increases. For example, the distribution is possible where the group velocity stays constant until a predetermined distance from the optical axis and increases as the distance from the optical axis increases within a range further than the predetermined distance.

Figure 6:
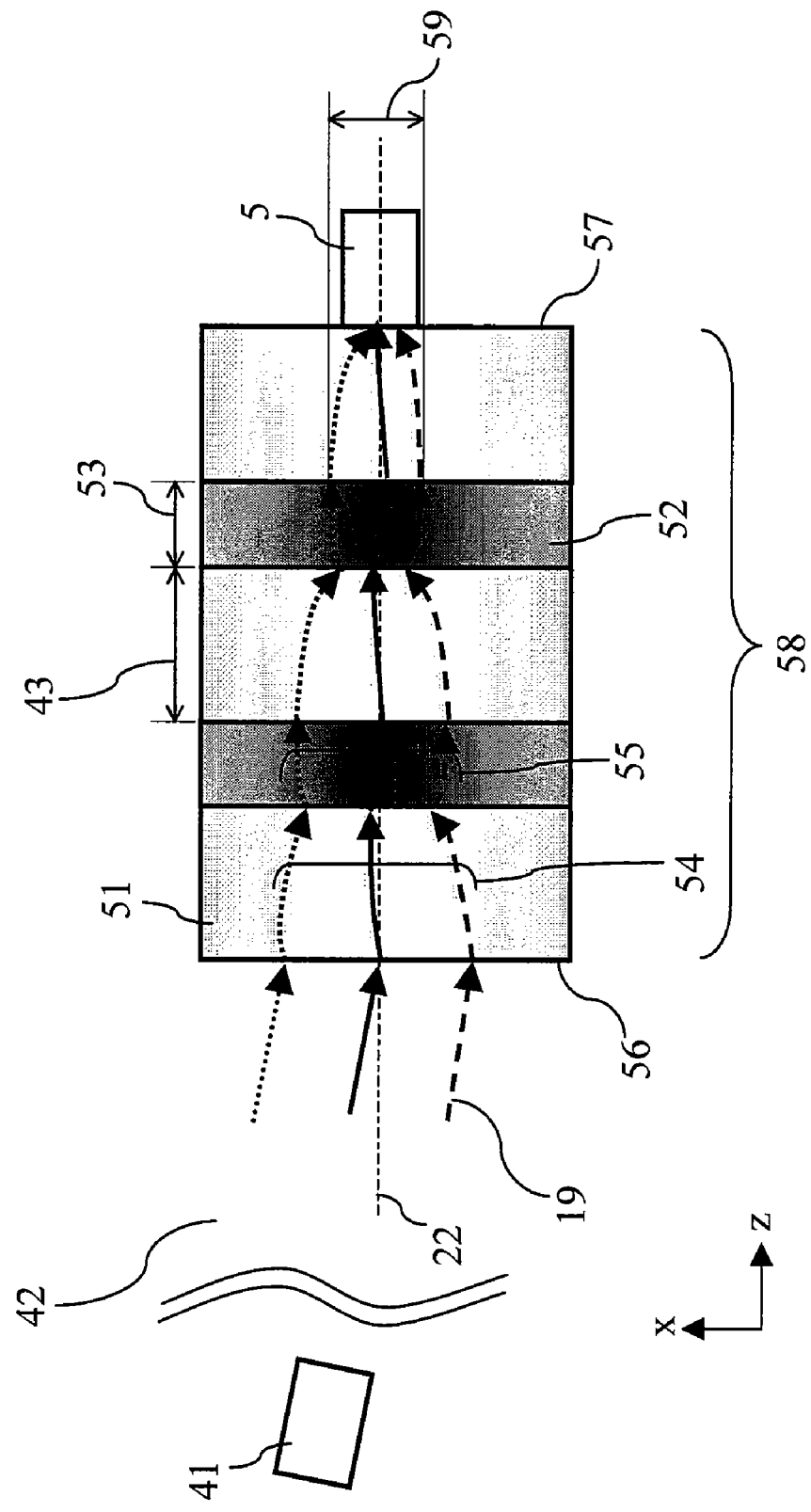
FIG. 6 illustrates a schematic configuration diagram of the case where the collimated light with angular misalignment enters into the light-receiving module in another configuration according to the third embodiment of the present invention.

FIG. 6 illustrates a schematic configuration diagram showing a propagation state where the angularly misaligned collimated light enters into the light-receiving module in another configuration of the third embodiment.

In a transmission section 58 of the light-receiving module of the third embodiment illustrated in FIG. 6, a plurality of graded negative refractive index photonic crystals 51 having the negative refraction angle and a plurality of graded positive refractive index photonic crystals 52 having the positive refraction angle are arranged in tandem alternatively, similarly as the transmission section 49 illustrated in FIG. 5.

The graded negative refractive index photonic crystal 51 and the graded positive refractive index photonic crystal 52 have the distribution of group velocities similar to that of the graded negative refractive index photonic crystal 17 and the graded positive refractive index photonic crystal 18 of FIG. 5, respectively. However, while the thickness of the respective graded negative refractive index photonic crystals 51 is the same as that of the respective graded negative refractive index photonic crystals 17 of FIG. 5, the thickness of the respective graded positive refractive index photonic crystals 52 is made thinner than that of the respective graded positive refractive index photonic crystals 18 of FIG. 5. In other words, in the transmission section 58 of FIG. 6, the thickness of the respective graded positive refractive index photonic crystals 52 is thinner than that of the respective graded negative refractive index photonic crystals 51.

Using FIG. 6, the description will be made to behavior of the propagating light shown when an angularly misaligned collimated incident light 19 enters into the light-receiving module.

As illustrated in FIG. 6, even in the case where the angularly misaligned collimated incident light 19 enters into the transmission section 58, it is condensed and diffused alternatively therein similarly as in FIG. 5 where there is no angular misalignment, and the outgoing light with a small beam diameter 59 can be obtained from the graded negative refractive index photonic crystal 51 at an outgoing end 57.

Change in the center of the beam is important in angularly misaligned incidence.

More specifically, since the center of the beam is refracted in the direction opposite to the angular misalignment direction of the angularly misaligned collimated incident light 19 in the graded negative refractive index photonic crystal 51 at an incident end 56, the angular misalignment of the angularly misaligned collimated incident light 19 is adjusted. Then, the angle is restored in the angular misalignment direction in the graded positive refractive index photonic crystal 52 which is arranged second.

Obviously, the adjustment and restoration of the angular misalignment are repeated by the graded negative refractive index photonic crystals 51 and the graded positive refractive index photonic crystals 52 arranged third or later in tandem. However, since a restoration amount of the angular misalignment can be reduced owing to an optical path length 53 of the graded positive refractive index photonic crystal 52 being made smaller than the optical path length 43 of the graded negative refractive index photonic crystal 51 in the light-receiving module of FIG. 6, an axial misalignment distance of a beam center position at the outgoing end 57 can be suppressed to the minimum.

It is also possible to eliminate the axial misalignment distance of the beam center position at the outgoing end 57 by adjusting the respective optical path lengths of the graded negative refractive index photonic crystal 51 and the graded positive refractive index photonic crystal 52.

In addition, in the case where the incident light is other than the collimated light, the condensed light with the minimum axial misalignment distance of the beam center position can be similarly emitted by adjusting the respective optical path lengths of the graded negative refractive index photonic crystal 51 and the graded positive refractive index photonic crystal 52.

As described above, in the light-receiving module of the third embodiment, the graded negative refractive index photonic crystals and the graded positive refractive index photonic crystals, in which the absolute value of the group velocity increases in proportion substantially to the inverse number of the square of the distance from the optical axis 22 of the transmission section, are arranged in tandem alternatively on the optical axis 22 so that the graded negative refractive index photonic crystals are disposed at both the incident end and the outgoing end, and the light-receiving section 5 is arranged in the vicinity or in contact with the outgoing end, allowing the optical system which is stably coupled with the light-receiving section 5 regardless of the state of the incident light being achieved.

Fourth Embodiment

Figure 7:
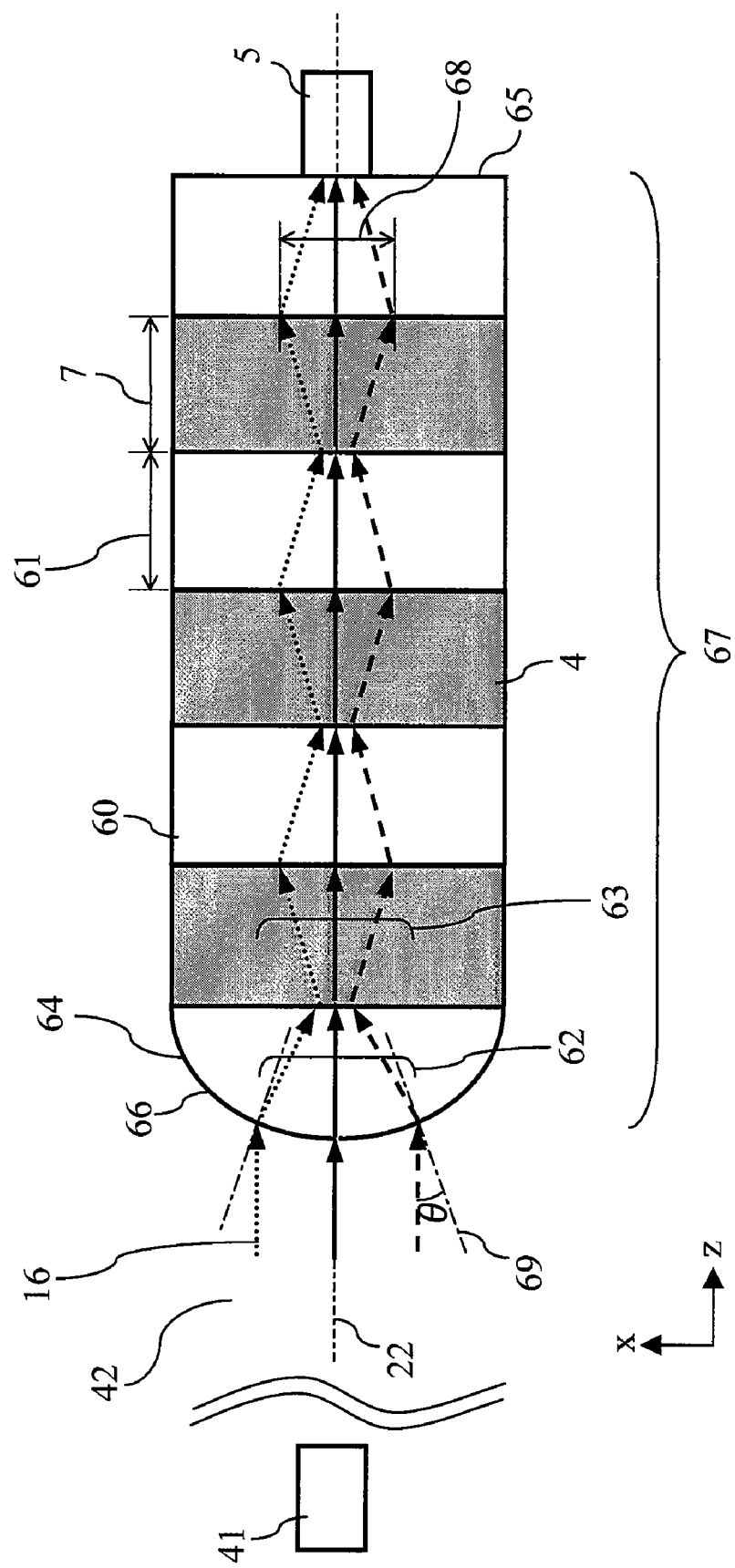
FIG. 7 illustrates a schematic configuration diagram of the light-receiving module according to a fourth embodiment of the present invention.

FIG. 7 illustrates a schematic configuration diagram of the light-receiving module of a fourth embodiment. Like reference numerals denote like components as those in FIGS. 1 and 5.

The configuration and operation of the light-receiving module of the fourth embodiment are described hereinbelow by primarily referring to FIG. 7.

The light-receiving module of the fourth embodiment is provided with a transmission section 67 and the light-receiving section 5.

The transmission section 67 is, similarly with that of the first embodiment, provided with a plurality of negative refractive index photonic crystals 60 and a plurality of positive refractive index photonic crystals 4, which are arranged in tandem alternatively on the optical axis 22 of the transmission section 67 so that the negative refractive index photonic crystals 60 are disposed at both an incident end 64 and an outgoing end 65 of the transmission section 67.

In addition, an incident face of the negative refractive index photonic crystal 60 at the incident end 64 is a convex curved surface 66 having a negative curvature radius in the optical axis 22 direction.

The light-receiving section 5 is disposed in the vicinity or in contact with the outgoing end 65 of the transmission section 67 so that the optical axis of the light-receiving section 5 overlaps with the optical axis 22 of the transmission section 67.

The transmission section 67 is different from the transmission section 14 of the first embodiment illustrated in FIG. 1 only in the shape of the negative refractive index photonic crystal 60 at the incident end 64.

The light entering from the light source 41 through the free space 42 is the collimated incident light 16, and the convex curved surface 66 is shaped so that an angle (herein, 0 degree) between the optical axis 22 and a projection component of the collimated incident light 16 to a plane (here, a paper surface) containing a perpendicular 69 and the optical axis 22 at an incident point on the incident curved surface 66 of the negative refractive index photonic crystal 60 at the incident end 64 is smaller than an angle θ between the perpendicular 69 and the optical axis 22.

In the case where the incident light is the collimated or diffused light with no angular misalignment, the angle between the optical axis 22 and the projection component of the incident light to the plane containing the perpendicular and the optical axis 22 at the incident position on the incident curved surface 66 is always smaller than the angle θ between the perpendicular and the optical axis 22 as described above. Therefore, the collimated incident light 16 is refracted in the condensing direction as with a lens by the incident curved surface 66 of the negative refractive index photonic crystal 60 at the incident end 64.

The light is refracted at the interface in the diffusing direction in the positive refractive index photonic crystal 4 arranged second.

Subsequently, the condensation and diffusion are repeated by the negative and positive refractive index photonic crystals 60 and 4 which are arranged third or later in tandem.

If the absolute value of the refraction angle of the negative refractive index photonic crystal 60 is the same as that of the positive refractive index photonic crystal 4, the maximum value of the beam diameter 68 of the incident light is maintained to be substantially the same until the beam is emitted as the outgoing light by setting the optical path lengths of the respective photonic crystals to be equal with each other, and the light is condensed by the negative refractive index photonic crystal 60 at the outgoing end 65. Thereby, it can be readily coupled with the light-receiving section 5 in the vicinity of the outgoing end 65.

Here, by equalizing the phase velocities at the respective interfaces between the negative and positive refractive index photonic crystals 60 and 4, the Fresnel reflection at the respective interfaces can be reduced.

In addition, the positive refractive index material forming the positive refractive index photonic crystal 4 is not limited to the photonic crystal but any material with the positive refractive index can be utilized.

Figure 8:
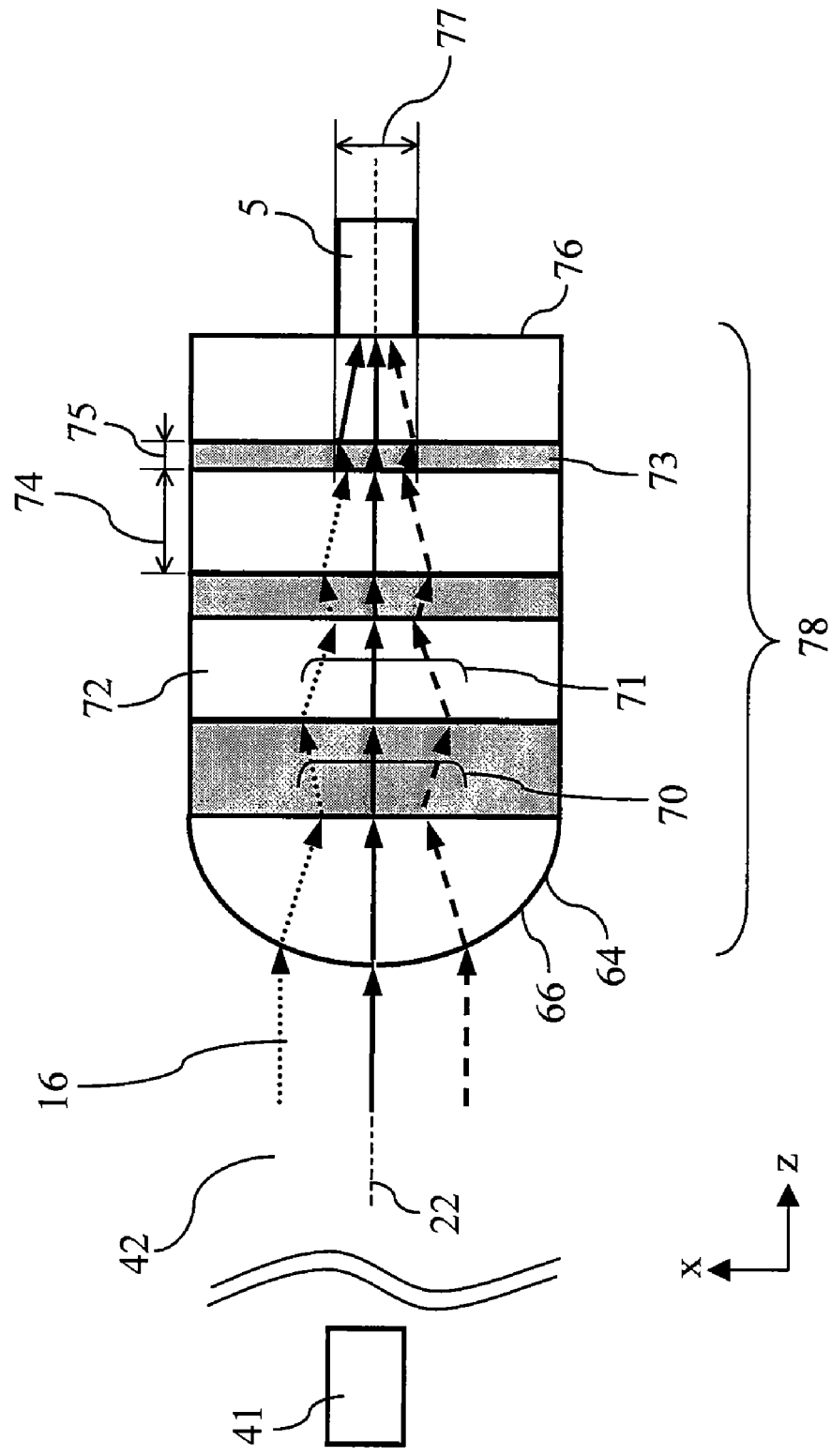
FIG. 8 illustrates a schematic configuration diagram of the case where the collimated light with no angular misalignment enters into the light-receiving module in another configuration according to the fourth embodiment of the present invention.

FIG. 8 illustrates a schematic configuration diagram of the light-receiving module in another configuration of the fourth embodiment.

The light-receiving module is provided with a transmission section 78 and the light-receiving section 5, wherein, as with the configuration of FIG. 7, the transmission section 78 is provided with negative and positive refractive index photonic crystals 72 and 73 arranged in tandem alternatively on the optical axis 22. The negative and positive refractive index photonic crystals 72 and 73 used here are those having the same absolute value of the group velocity.

Although the optical path length 61 of the respective negative refractive index photonic crystals is equal to the optical path length 7 of the respective positive refractive index photonic crystals in the transmission section 67 of FIG. 7, an optical path length 75 of the positive refractive index photonic crystal is varied shorter toward an outgoing end 76 in the transmission section 78 of FIG. 8. By configuring in this manner, a diffusing optical path length becomes shorter than a condensing optical path length and a beam diameter 77 at the outgoing end 76 becomes smaller than the beam diameter of the collimated incident light 16, allowing it to be readily coupled to the light-receiving section 5 having the smaller light-receiving area.

Figure 9:
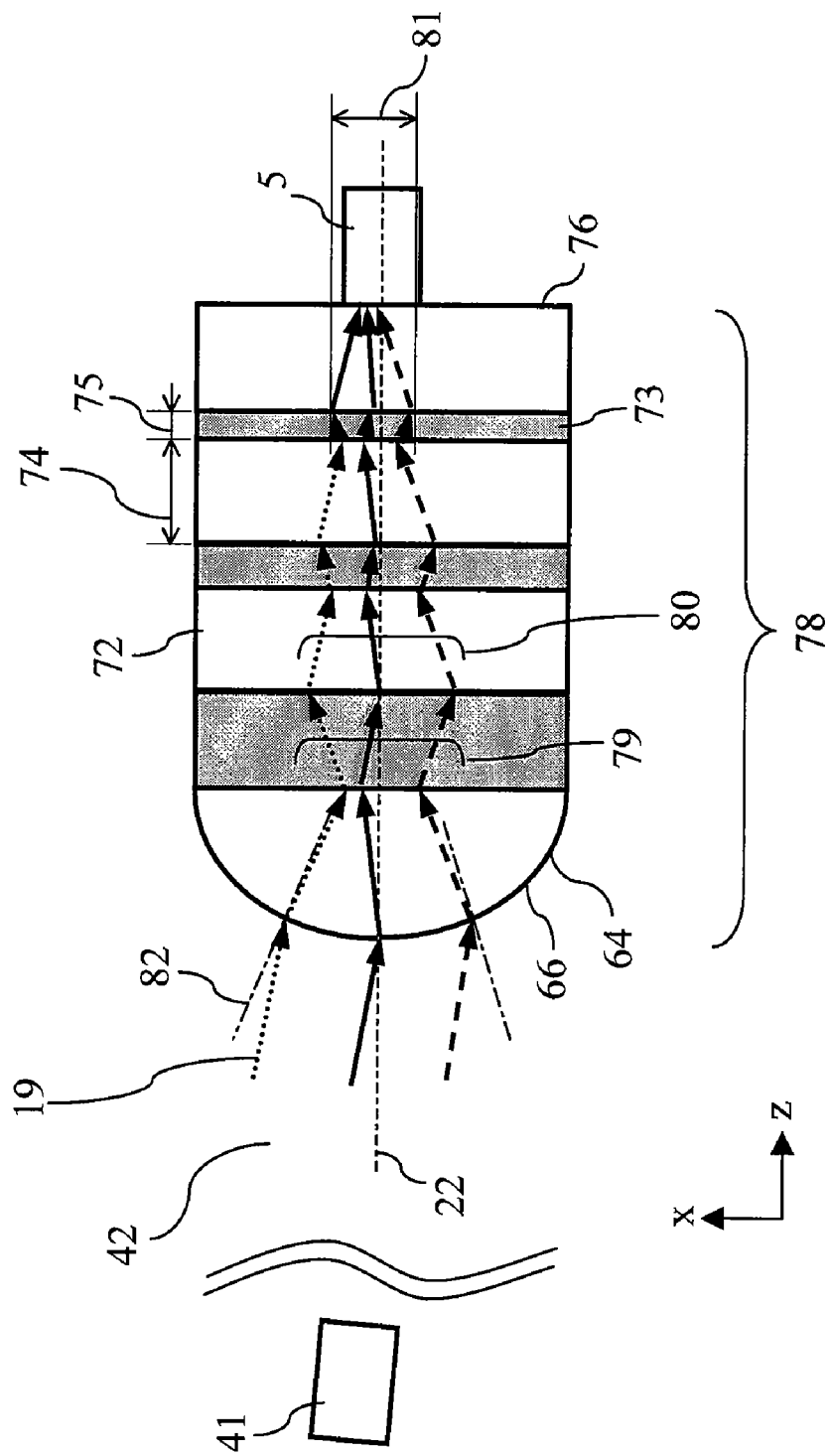
FIG. 9 illustrates a schematic configuration diagram of the case where the collimated light with angular misalignment enters into the light-receiving module in yet another configuration according to the fourth embodiment of the present invention.

FIG. 9 illustrates a schematic configuration diagram of the case where the angularly misaligned collimated light enters into the light-receiving module of the fourth embodiment illustrated in FIG. 8.

Using FIG. 9, the description will be made to behavior of the propagating light shown when the angularly misaligned collimated incident light 19 enters.

Even when the angularly misaligned collimated incident light 19 enters, a light beam (shown by the dashed line in FIG. 9) entering into the incident curved surface from the direction opposite to the angular misalignment direction is always refracted so that the angular misalignment is adjusted at the incident curved surface 66 of the negative refractive index photonic crystal 72 at the incident end 64.

In contrast, as for the light beam (shown by the dotted line in FIG. 9) entering into the incident curved surface from the angular misalignment direction, it is refracted in the optical axis 22 direction at the incident curved surface 66 of the negative refractive index photonic crystal 60 at the incident end 64 when the curved surface 66 is designed so that the angle between the optical axis 22 and the projection component of the incident light to the plane containing a perpendicular 82 and the optical axis 22 at the incident position on the incident curved surface 66 is smaller than the angle between the perpendicular 82 and the optical axis 22.

Thus, the center of the beam is refracted in the direction opposite to the angular misalignment direction of the incident light in the negative refractive index photonic crystal 72 at the incident end 64 regardless whether the angular misalignment is present or not, resulting in the angular misalignment of the incident light being adjusted. Subsequently, the beam is restored in the angular misalignment direction in the positive refractive index photonic crystal 73 arranged second.

Obviously, the adjustment and restoration of the angular misalignment are repeated by the graded negative refractive index photonic crystals 72 and the graded positive refractive index photonic crystals 73 arranged third or later in tandem. However, since the restoration of the angular misalignment can be reduced by setting the optical path length 75 of the graded positive refractive index photonic crystal shorter than the optical path length 74 of the grade negative refractive index photonic crystal, allowing the axial misalignment distance of the beam center position at the outgoing end 76 being suppressed to the minimum.

It is also possible to eliminate the axial misalignment distance of the beam center position at the outgoing end 76 by adjusting the respective optical path lengths of the graded negative refractive index photonic crystal 72 and the graded positive refractive index photonic crystal 73.

In addition, when the incident light is other than the collimated light, the condensed light with the minimum axial misalignment distance of the beam center position can be emitted similarly by adjusting the shape of the curved surface at the incident end 64.

When the angular misalignment becomes larger, a portion of the light beam entering into the incident curved surface from the angular misalignment direction may be larger in the angle between the optical axis and the projection component of the incident light to the plane containing the perpendicular and the optical axis at the incident position on the incident curved surface than the angle between the perpendicular and the optical axis. In this case, as for such a portion of the light beam, the refraction at the incident surface of the negative refractive index photonic crystal will be in the dispersing direction, which may not contribute to the coupling with the light-receiving section.

Therefore, in order to propagate the beam within an axial range of the assumed incident light, it is sufficient to design the convex curved surface in which the angle between the optical axis and the projection component of the incident light to the plane containing the perpendicular and the optical axis at the incident point on the incident curved surface of the negative refractive index photonic crystal at the incident end is (1) of the opposite sign with that of the angle between the perpendicular and the optical axis, or (2) of the non-opposite sign with that of the angle between the perpendicular and the optical axis, and the absolute value thereof being smaller than the absolute value of the angle between the perpendicular and the optical axis, for the light beam of the outermost periphery of the assumed beam.

Figure 10:
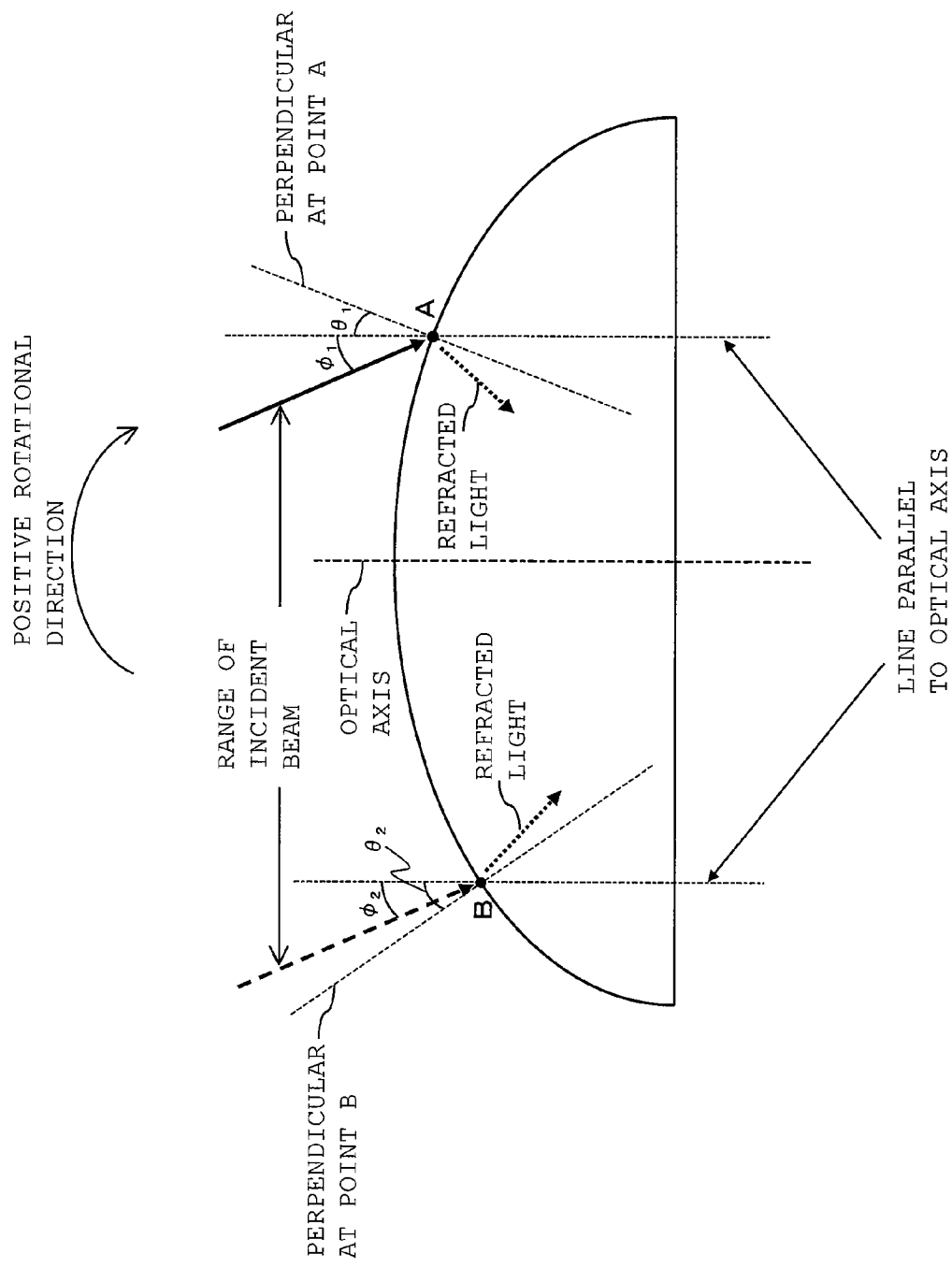
FIG. 10 illustrates a diagram describing a constitutional condition for propagating the angularly misaligned incident light to the light-receiving section for an incident curved surface of the light-receiving module according to the fourth embodiment of the present invention.

FIG. 10 illustrates a diagram describing a constitutional condition of the incident curved surface for propagating the angularly misaligned incident light to the light-receiving section.

It shows the state where the beam misaligned with respect to the optical axis of the transmission section enters into the incident curved surface. The solid line and dashed line represent the light beam on the outermost periphery of the incident beam. In other words, in a cross section illustrated in FIG. 10, the beam enters into the incident curved surface between points A and B.

When considering the light beam at a right edge of the incident beam entering at the point A, represented by the solid line, the angle between the light beam and the optical axis is $\Phi_1$ which is the angle in the opposite direction to the positive rotational direction with respect to the optical axis, i.e., the negative angle. Meanwhile, the angle between the perpendicular and the optical axis at the point A is $\theta_1$ which is the angle in the same direction with the positive rotational direction with respect to the optical axis, i.e., the positive angle. In other words, $\Phi_1$ and $\theta_1$ are of the different signs, which satisfies the condition (1) above.

Next, when considering the light beam at a left edge of the incident beam entering at the point B, represented by the dashed line, the angle between the light beam and the optical axis is $\Phi_2$ which is the angle in the opposite direction to the positive rotational direction with respect to the optical axis, i.e., the negative angle. Meanwhile, the angle between the perpendicular and the optical axis at the point B is $\theta_2$ which is the angle in the opposite direction to the positive rotational direction with respect to the optical axis, i.e., the negative angle as well. In other words, $\Phi_2$ and $\theta_2$ are of the same sign and $\Phi_2$ is smaller than $\theta_2$, which satisfy the condition (2) above.

Since the incident curved surface is constituted of the negative refractive index photonic crystal and thus the incident light at the incident point is refracted with the negative refraction angle, the light beams entering at both the points A and B are refracted in the condensing direction toward the optical axis as represented by the dotted arrow in FIG. 10.

By designing the incident curved surface to be convex, all the light beams entering between the points A and B are also refracted in the condensing direction.

Consequently, as for the light beam of the outermost periphery of the assumed beam, the incident light within the assumed axial range can be propagated by configuring the curved surface to satisfy the condition (1) or (2) above. The condition is valid as well where the incident light is the dispersed light or collimated light.

Moreover, a functional device such as a polarizer or a filter may be arranged on the interface between the negative and positive refractive index photonic crystals adjacent each other, where the condensed beam diameter is small.

Figure 11:
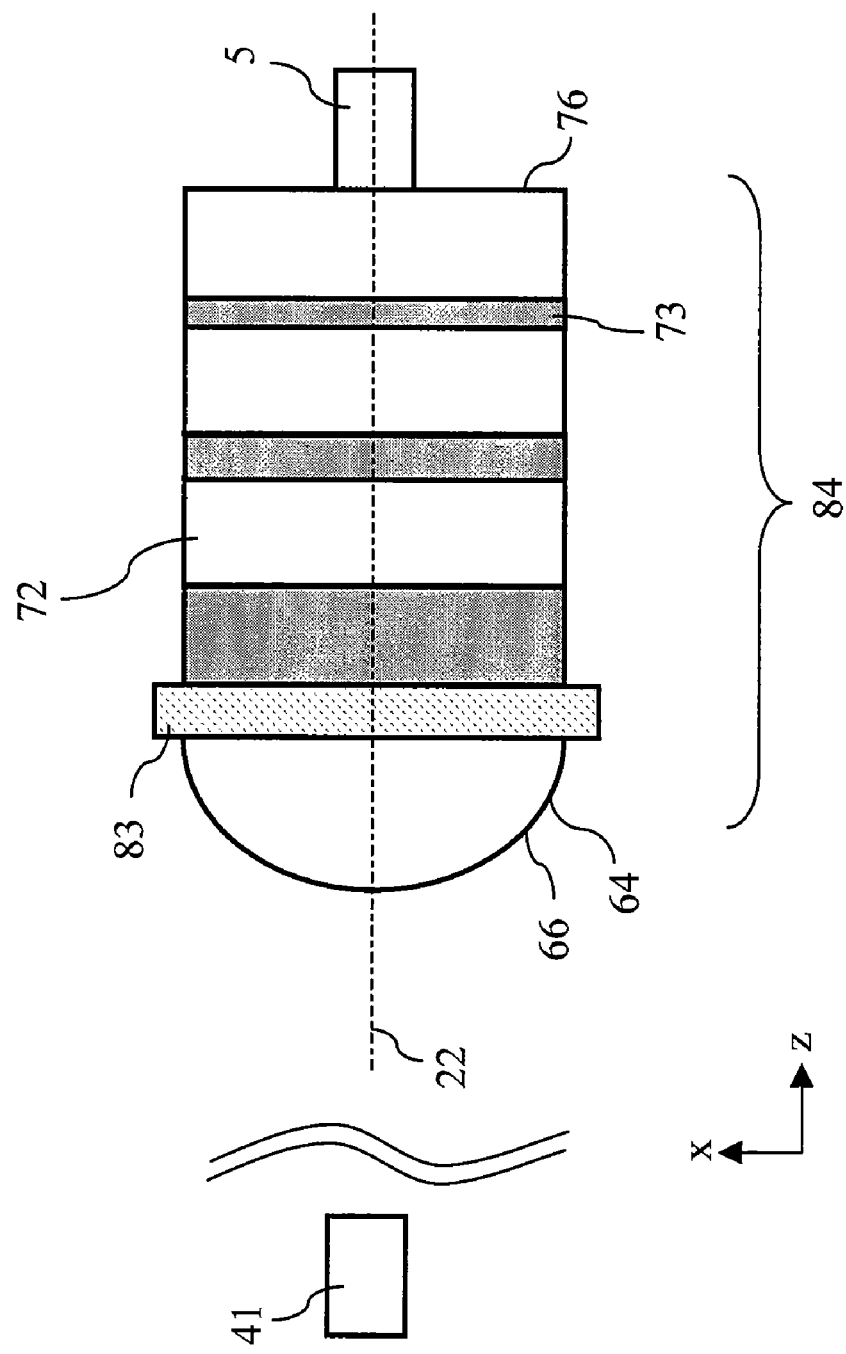
FIG. 11 is a schematic configuration diagram of the light-receiving module according to the fourth embodiment of the present invention, wherein an optical filter is arranged.
Figure 12:
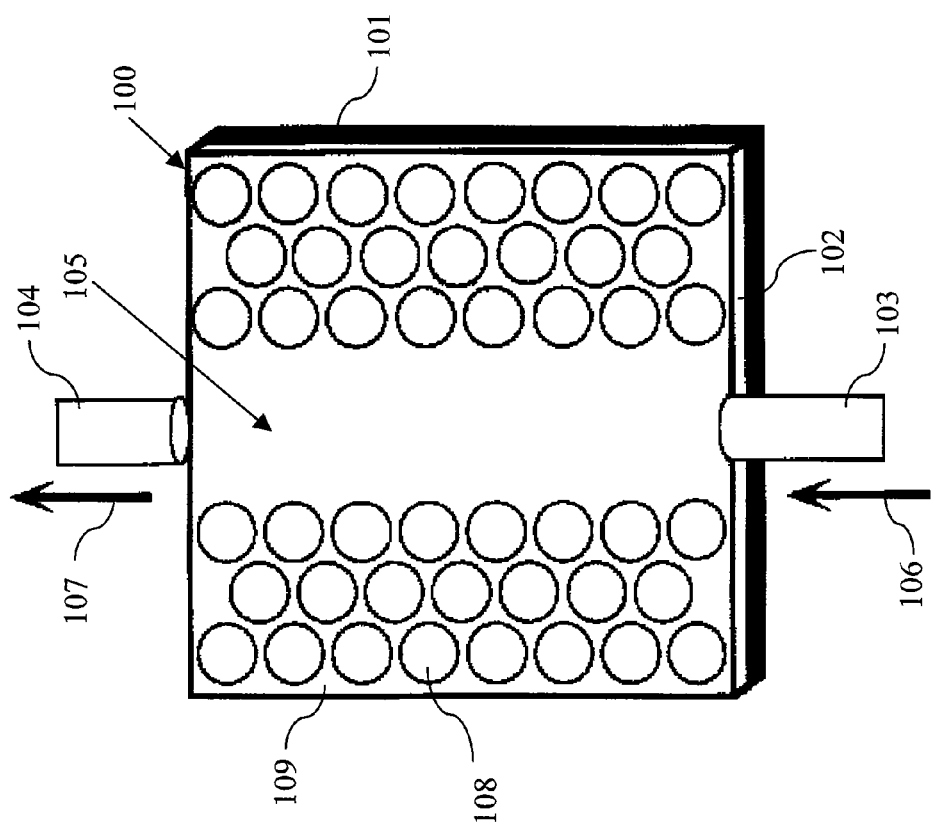
FIG. 12 illustrates a configuration diagram schematically showing a conventional photonic crystal waveguide.
Figure 13A:
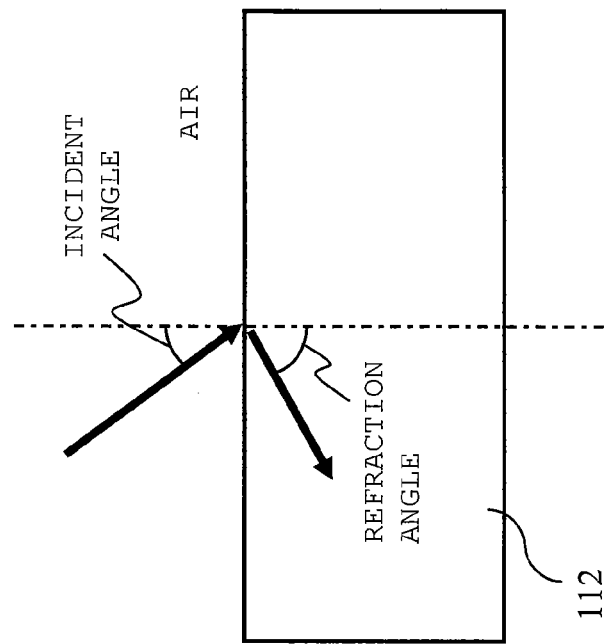
FIG. 13(A) illustrates a schematic diagram showing a refraction phenomenon in a general material.
Figure 13B:
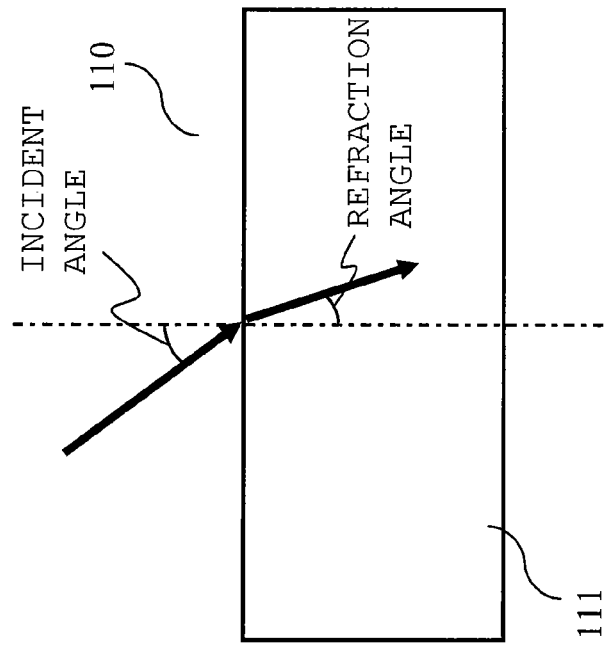
FIG. 13(B) illustrates a schematic diagram showing the refraction phenomenon in the photonic crystal when an optical beam enters from the air.

FIG. 11 illustrates a schematic configuration diagram of the light-receiving module where an optical filter is arranged between the photonic crystals of the light-receiving module in the configuration of FIG. 8.

An optical filter 83 is disposed between the negative refractive index photonic crystal 72 at the incident end 64 and the positive refractive index photonic crystal 73 arranged second from the incident end 64 side of the transmission section 78 of FIG. 8 to configure a transmission section 84.

Note herein that the optical filter 83 in the transmission section 84 corresponds to an example of a third optical member of the present invention.

By disposing the functional device such as the optical filter 83 in the transmission section, the transmission optical system can be coupled efficiently with the light-receiving section 5 having the small area without depending on the state of the incident light (such as the beam diameter and the axial misalignment).

Although FIG. 11 illustrates the example where the optical filter 83 is disposed between the negative refractive index photonic crystal 72 at the incident end 64 side and the positive refraction photonic crystal 73 arranged second, it may be disposed between other negative and positive refractive index photonic crystals 72 and 73 or may be disposed between a plurality of these positions. In addition, although FIG. 11 illustrates the example where the functional device is disposed in the light-receiving module of the fourth embodiment in the configuration of FIG. 8, the similar effect can be obtained by disposing such a functional device in the respective light-receiving modules in the configurations described in the first to third embodiments.

Note that, although the respective embodiments are described using the configurations where the refracted light does not intersect within the respective photonic crystals, the photonic crystal having the thickness so that the refracted light intersects therein may be used. In the case that the refracted light intersects within the photonic crystal, condensing/diffusing functions of the beam within the positive and negative refractive index photonic crystals arranged subsequently will be switched. In other words, when the refracted light intersects within the negative refractive index photonic crystal arranged at the incident end, the beam outgoing from the negative refractive index photonic crystal would be the condensed beam and, in which case, the transmission section of the present invention may be constituted of only two photonic crystals, i.e., one negative refractive index photonic crystal at the incident end and one positive refractive index photonic crystal arranged subsequently in tandem.

While the present invention is the invention of the optical transmission device which transmits the light and the light-receiving module, the configuration of the negative and positive refractive index photonic crystals arranged in tandem described in the respective embodiments is applicable for any electromagnetic wave.

INDUSTRIAL APPLICABILITY

The optical transmission device and the light-receiving module according to the present invention are useful as the optical transmission device and the light-receiving module which can be utilized for the waveguide to transmit the light, for they have the effects that they can be coupled with the incident beam having the large diameter and allow those which can guide the light to an arbitrary light-receiving position to be readily fabricated.

What is claimed is:

1. An optical transmission device having an optical axis, said optical transmission device comprising:
    an N+1 number of first optical members having a negative refraction angle with respect to an incident angle of a beam, where N is a positive integer; and
    an N number of second optical members having a positive refraction angle with respect to the incident angle,
    wherein the first optical members and the second optical members are alternately arranged along said optical axis, and
    the optical transmission device includes an incident end to receive the beam and an outgoing end, each of the incident end and the outgoing end comprising the first optical member.

2. The optical transmission device according to claim 1, wherein the beam is a diffused light,
    and wherein the first optical member and the second optical member have optical path lengths equal to each other and absolute values of group velocities of the beam equal to each other.

3. The optical transmission device according to claim 1, wherein the beam is a collimated light,
    and wherein the group velocity of the beam in the first optical member and the group velocity of the beam in the second optical member vary depending on a distance from the optical axis.

4. The optical transmission device according to claim 3, wherein the absolute values of the group velocity of the beam in the first optical member and the group velocity of the beam in the second optical member do not decrease depending on the distance from the optical axis.

5. The optical transmission device according to claim 1, wherein the beam is the collimated light, and wherein a refractive index of the first optical member and a refractive index of the second optical member vary depending on the distance from the optical axis.

6. The optical transmission device according to claim 1, wherein the beam is the collimated light, and wherein the incident end is constituted of the first optical member having a curved surface.

7. The optical transmission device according to claim 6, wherein the curved surface is convex.

8. The optical transmission device according to claim 7, wherein, at an incident point to the curved surface on the outermost periphery of the beam, an angle between the optical axis and a projection component of the beam to a plane containing a perpendicular and the optical axis at the incident point is (1) of a different sign with that of an angle between the perpendicular and the optical axis or (2) of a non-different sign with that of the angle between the perpendicular and the optical axis and the absolute value thereof being smaller than the absolute value of the angle between the perpendicular and the optical axis.

9. The optical transmission device according to claim 1, wherein at least the first optical member is constituted of a photonic crystal.

10. The optical transmission device according to claim 1, wherein a phase velocity related to a wavelength of the beam in the first optical member is substantially equal to the phase velocity related to the wavelength of the beam in the second optical member.

11. The optical transmission device according to claim 1, wherein the absolute values of the group velocities of the beam are equal to each other in the first and second optical members, and wherein at least the first optical member or the second optical member is plural in number and the first optical member or the second optical member includes that with a different thickness.

12. The optical transmission device according to claim 11, wherein the thickness of the first optical member and/or the second optical member vary along the optical axis direction.

13. The optical transmission device according to claim 11, wherein the total of the thickness of the first optical member is greater than the total of the thickness of the second optical member.

14. The optical transmission device according to claim 1, wherein a third optical member, which is different from both the first optical member and the second optical member, is arranged between a pair of the adjacent first and second optical members.

15. A light-receiving module comprising:
the optical transmission device according to claim 1; and
a light-receiving section arranged in the vicinity of the outgoing end of the optical transmission device.

16. The light-receiving module according to claim 15, wherein a beam diameter at the incident end of the optical transmission device is different from the beam diameter at the outgoing end of the optical transmission device.

17. The light-receiving module according to claim 16, wherein the beam diameter varies along the optical axis direction.

18. The light-receiving module according to claim 17, wherein the beam diameter substantially decreases along the optical axis direction.

* * * * *